US012261387B2

(12) United States Patent
Hiramatsu et al.

(10) Patent No.: US 12,261,387 B2
(45) Date of Patent: Mar. 25, 2025

(54) CONNECTOR INCLUDING CLOSED PORTION FORMED BY SPACE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Kazuki Hiramatsu, Mie (JP); Taiga Kadoyama, Mie (JP); Hidekazu Matsuda, Mie (JP); Toshikazu Suzuki, Osaka (JP); Toshifumi Ichio, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 356 days.

(21) Appl. No.: 17/868,247

(22) Filed: Jul. 19, 2022

(65) Prior Publication Data

US 2023/0033745 A1 Feb. 2, 2023

(30) Foreign Application Priority Data

Jul. 27, 2021 (JP) ................................ 2021-122069

(51) Int. Cl.
*H01R 13/40* (2006.01)
*H01R 13/504* (2006.01)
(Continued)

(52) U.S. Cl.
CPC .......... *H01R 13/40* (2013.01); *H01R 13/504* (2013.01); *H01R 13/516* (2013.01); *H01R 13/639* (2013.01); *H01R 13/6581* (2013.01)

(58) Field of Classification Search
CPC .................................................... H01R 13/639
See application file for complete search history.

(56) References Cited

U.S. PATENT DOCUMENTS 9,065,198 B2 * 6/2015 Uchida .............. H01R 13/5219
2018/0034185 A1 * 2/2018 Nagasaka ............ H01R 13/428
(Continued)

FOREIGN PATENT DOCUMENTS

JP 2002-260773 A 9/2002
JP 2002-270281 A 9/2002
(Continued)

*Primary Examiner* — Abdullah A Riyami
*Assistant Examiner* — Amara Anderson
(74) *Attorney, Agent, or Firm* — Venjuris, P.C.

(57) ABSTRACT

A connector is provided with a terminal, a die-cast member for surrounding an outer periphery of the terminal, a dielectric to be arranged between the terminal and the die-cast member, and a housing into which the die-cast member is mounted. The die-cast member includes a locking protrusion, and the housing includes a locking recess recessed in a mounting direction of the die-cast member. The locking protrusion is press-fit into the locking recess. A closing portion shut off from outside is formed between a tip part of the locking protrusion in the mounting direction and a back end part of the locking recess in the mounting direction.

7 Claims, 8 Drawing Sheets

(51) Int. Cl.

| | |
|---|---|
| ***H01R 13/516*** | (2006.01) |
| ***H01R 13/639*** | (2006.01) |
| ***H01R 13/6581*** | (2011.01) |

(56) References Cited

U.S. PATENT DOCUMENTS

| | | | | |
|---|---|---|---|---|
| 2022/0102885 | A1* | 3/2022 | Maesoba | H01R 24/50 |
| 2022/0311151 | A1* | 9/2022 | Endo | H01R 9/0518 |

FOREIGN PATENT DOCUMENTS

| | | | | | |
|---|---|---|---|---|---|
| JP | 2002280123 | A | * | 9/2002 | H01R 12/775 |
| JP | 2006-031961 | A | | 2/2006 | |
| JP | 2011-060451 | A | | 3/2011 | |
| JP | 2014-203537 | A | | 10/2014 | |
| JP | 2014-203538 | A | | 10/2014 | |
| JP | 2020109738 | A | * | 7/2020 | H01R 12/716 |

* cited by examiner

CONNECTOR INCLUDING CLOSED PORTION FORMED BY SPACE

CROSS-REFERENCE TO RELATED APPLICATIONS

This application is based on and claims priority from Japanese Patent Application No. 2021-122069, filed on Jul. 27, 2021, with the Japan Patent Office, the disclosure of which is incorporated herein in its entirety by reference.

TECHNICAL FIELD

The present disclosure relates to a connector.

BACKGROUND

A connector disclosed in Japanese Patent Laid-open Publication No. 2020-109738 is a connector for high speed communication and provided with a terminal as an inner conductor, a die-cast member as an outer conductor, a dielectric arranged between the die-cast member and the terminal and a housing, into which the die-cast member is mounted. The die-cast member includes a locking recess penetrating in a mounting direction into the housing. The housing includes a locking protrusion to be inserted into the locking recess. A tip part of the locking protrusion is squeezed and expanded in dimensions with the locking protrusion inserted in the locking recess. The die-cast member is held in the housing by locking the tip part of the locking protrusion to an opening edge part of the locking recess. Note that techniques on connectors are also known from Japanese Patent Laid-open Publication Nos. 2014-203538, 2014-203537, 2011-060451, 2006-031961, 2002-270281 and 2002-260773.

SUMMARY

In the above case, since a step of squeezing the tip part of the locking protrusion is necessary, there is a problem of increasing the number of process steps. In contrast, it is also possible to adopt a configuration for holding the die-cast member in the housing by providing a locking protrusion on the die-cast member, providing a locking recess in the housing and press-fitting the locking protrusion of the die-cast member into the locking recess of the housing. However, since the die-cast member is a cast body, the locking protrusion of the die-cast member is required to have a simple structure. Further, there is a concern that the locking protrusion of the die-cast member scrapes resin of the housing to produce resin pieces in a press-fitting process. Thus, the die-cast member is also required to have a structure for holding resin pieces in the housing so that the resin pieces do not fall.

Accordingly, the present disclosure aims to provide a connector capable of easily realizing a structure for holding a die-cast member in a housing with good reliability.

The present disclosure is directed to a connector with a terminal, a die-cast member for surrounding an outer periphery of the terminal, a dielectric to be arranged between the terminal and the die-cast member, and a housing, the die-cast member being mounted into the housing, wherein the die-cast member includes a locking protrusion, the housing includes a locking recess recessed in a mounting direction of the die-cast member, the locking protrusion is press-fit into the locking recess, and a closing portion shut off from outside is formed between a tip part of the locking protrusion in the mounting direction and a back end part of the locking recess in the mounting direction with the die-cast member mounted in the housing.

According to the present disclosure, it is possible to provide a connector capable of easily realizing a structure for holding a die-cast member in a housing with good reliability.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
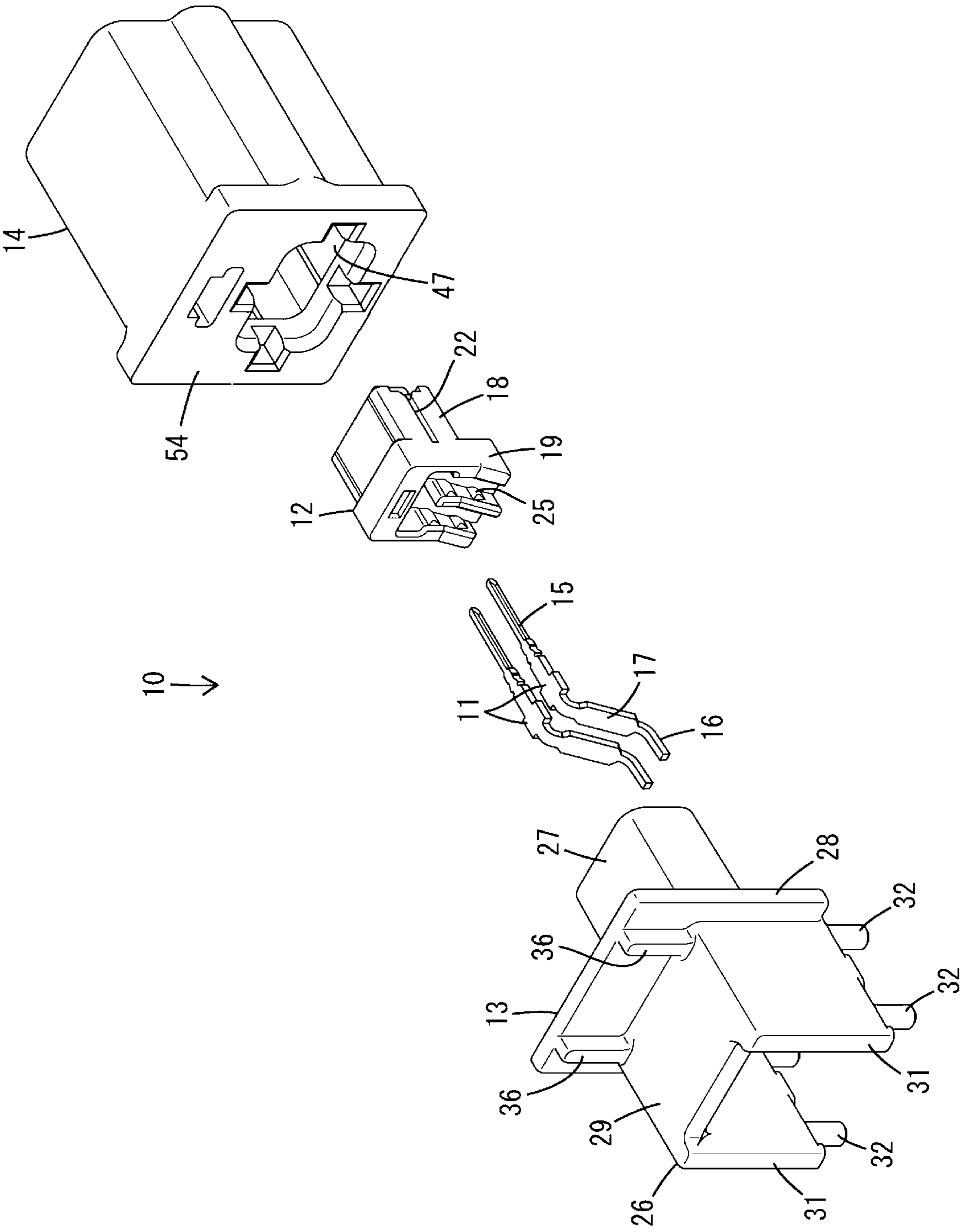
FIG. 1 is an exploded perspective view of a connector of an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The connector of the present disclosure is provided with a terminal, a die-cast member for surrounding an outer periphery of the terminal, a dielectric to be arranged between the terminal and the die-cast member, and a housing, the die-cast member being mounted into the housing, wherein the die-cast member includes a locking protrusion, the housing includes a locking recess recessed in a mounting direction of the die-cast member, the locking protrusion is press-fit into the locking recess, and a closing portion shut off from outside is formed between a tip part of the locking protrusion in the mounting direction and a back end part of the locking recess in the mounting direction with the die-cast member mounted in the housing.

By press-fitting the locking protrusion of the die-cast member into the locking recess, the die-cast member is held in the housing. Even if the locking protrusion scrapes resin of the housing in the process of mounting the die-cast member, produced resin pieces can be kept in the closing portion formed between the locking protrusion and the locking recess. Thus, the fall of the resin pieces to outside can be simply prevented without complicating a structure.

(2) Preferably, the locking protrusion is formed with a press-fit projection protruding in a direction intersecting the mounting direction, and the closing portion is formed further on a back side in the mounting direction than a part of an inner surface of the locking recess to be locked by the press-fit projection inside the locking recess.

By locking the press-fit projection to the inner surface of the locking recess in this way, the die-cast member is stably held in the housing. Further, since the closing portion is formed further on the back side than the part to be locked by the press-fit projection inside the locking recess, a sealed state of the closing portion can be satisfactorily maintained.

(3) The die-cast member may include a receptacle, the terminal being arranged inside the receptacle, and a protruding portion protruding in a direction intersecting the mounting direction from a base end side of the receptacle, and the locking protrusion may be formed to be connected to a front surface of the protruding portion facing in the mounting direction and an outer peripheral surface of the receptacle.

If the locking protrusion is formed in this way, the structure of a die for molding the die-cast member is not particularly complicated.

(4) The housing may have a back surface facing the front surface of the protruding portion and a through hole open in the back surface, the receptacle being arranged inside the through hole, and the locking recess may communicate with the through hole and be open in the back surface of the housing.

If the locking recess is formed in this way, the structure of a mold for molding the housing is not particularly complicated.

(5) Ribs to be brought into contact with an inner peripheral surface of the through hole of the housing may be formed on both sides across the locking protrusion on the outer peripheral surface of the receptacle.

If the ribs are formed in this way, a holding force for holding the die-cast member in the housing can be enhanced and, further, rattling between the die-cast member and the housing can be suppressed.

Details of Embodiment of Present Disclosure

Embodiment

A specific example of an embodiment of the present disclosure is described below with reference to the drawings. Note that the present invention is not limited to this illustration and is intended to be represented by claims and include all changes in the scope of claims and in the meaning and scope of equivalents.

Figure 2:
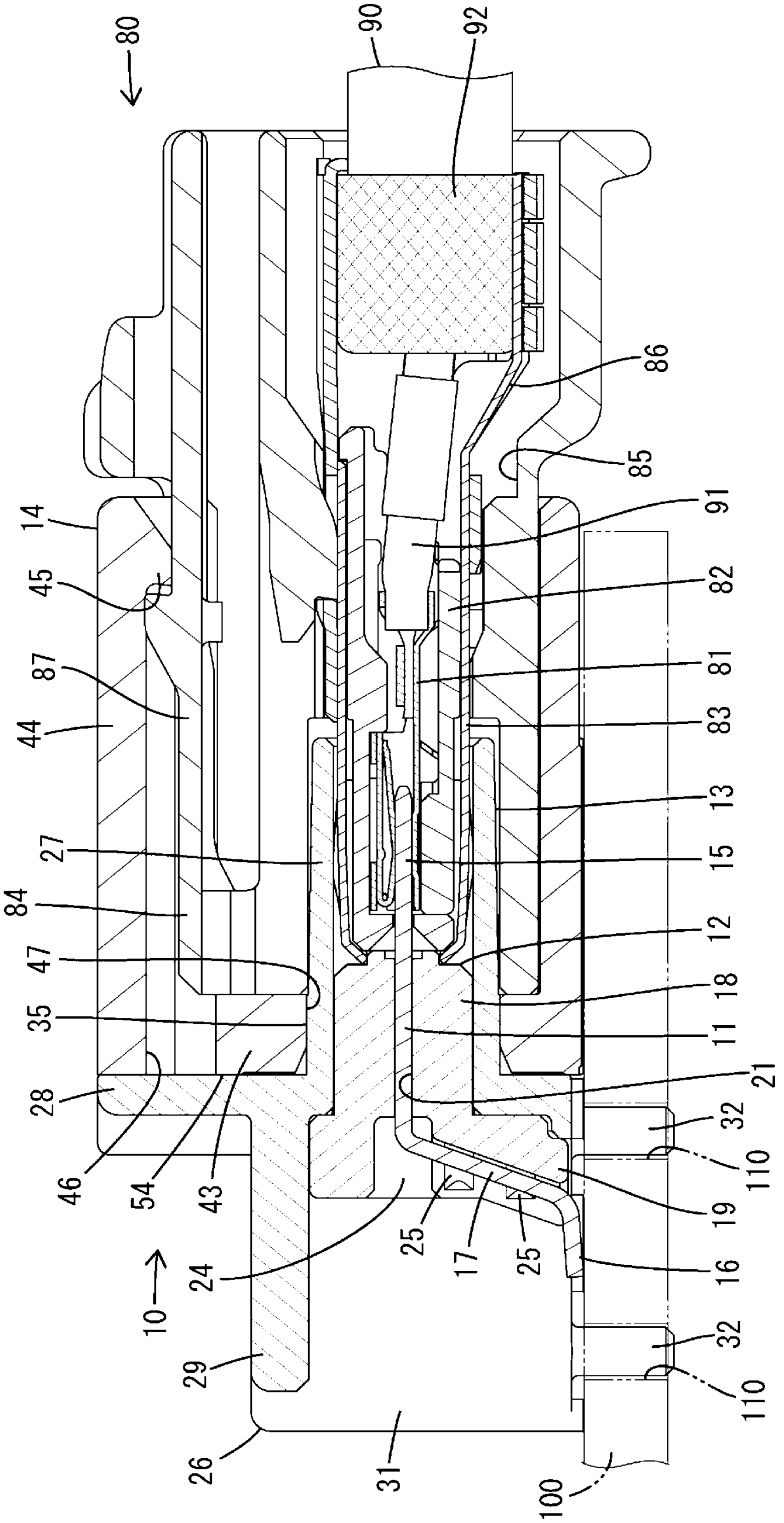
FIG. 2 is a side view in section showing a state where the connector is connected to a mating connector.

A connector 10 of this embodiment is a board connector to be mounted on a circuit board 100 and is, as shown in FIG. 1, provided with terminals 11, a dielectric 12, a die-cast member 13 and a housing 14. As shown in FIG. 2, the connector 10 is connected to a mating connector 80. The mating connector 80 is a shield connector connected to an end of a cable 90, in which a communication signal is transmitted. Note that, in the following description, surface sides facing each other when the connection of the connector 10 and the mating connector 80 is started are referred to as front sides concerning a front-rear direction. A vertical direction is based on a vertical direction in each figure except FIG. 8.

Mating Connector

The mating connector 80 is provided with mating terminals 81 as male terminals, a mating dielectric 82 for accommodating the mating terminals 81, an outer conductor 83 for surrounding the mating dielectric 82 and a mating housing 84 to be fit into the housing 14 as shown in FIG. 2. The mating terminals 81 are connected to wires 91 of the cable 90. The wires 91 are constituted by a pair of coated wires, and two mating terminals 81 are provided to correspond to the respective wires 91. The mating terminals 81 are arranged while being insulated from the outer conductor 83 by the mating dielectric 82. The outer conductor 83 is connected to a shield body 92 such as a braided wire of the cable 90. An accommodating portion 85 is formed to penetrate in the front-rear direction in the mating housing 84. A module 86 formed by assembling the mating terminals 81, the mating dielectric 82 and the outer conductor 83 is accommodated into the accommodating portion 85. Further, a resiliently deformable lock arm 87 is formed on the upper surface of the mating housing 84.

Terminals 11

The terminal 11 is made of an electrically conductive metal plate material and formed into an elongated shape as a whole as shown in FIG. 1. The terminal 11 includes a mate connecting portion 15, a board connecting portion 16 and a linking portion 17 arranged between the mate connecting portion 15 and the board connecting portion 16. The mate connecting portion 15 extends in the front-rear direction and, as shown in FIG. 2, has a rear part to be held in the dielectric 12 and a front part to be connected to the mating terminal 81. The linking portion 17 and the board connecting portion 16 are arranged to be exposed behind the dielectric 12. The linking portion 17 is formed to extend obliquely downward toward rear from the rear end of the mate connecting portion 15. The board connecting portion 16 extends rearward from the lower end of the linking portion 17 and is soldered and connected to an electrically conductive part of the circuit board 100.

Dielectric

The dielectric 12 is formed of an insulating synthetic resin material into a block as a whole. The dielectric 12 is L-shaped in a side view and includes a terminal mounting portion 18 extending in the front-rear direction and a terminal pull-out portion 19 connected to the rear end of the terminal mounting portion 18 and extending in the vertical direction. The terminal mounting portion 18 includes a pair of left and right mounting holes 21. Each mounting hole 21 penetrates through the terminal mounting portion 18 in the front-rear direction. The mating terminal 81 is inserted into the mounting hole 21 from behind. A rear part of the mate connecting portion 15 is press-fit and held in the mounting hole 21. As shown in FIG. 1, fitting grooves 22 (only one is shown in FIG. 1) extending in the front-rear direction are formed in both left and right side surfaces of the dielectric 12. Later-described fitting projections 33 of the die-cast member 13 are inserted into the fitting grooves 22 (see FIG. 5).

Figure 3:
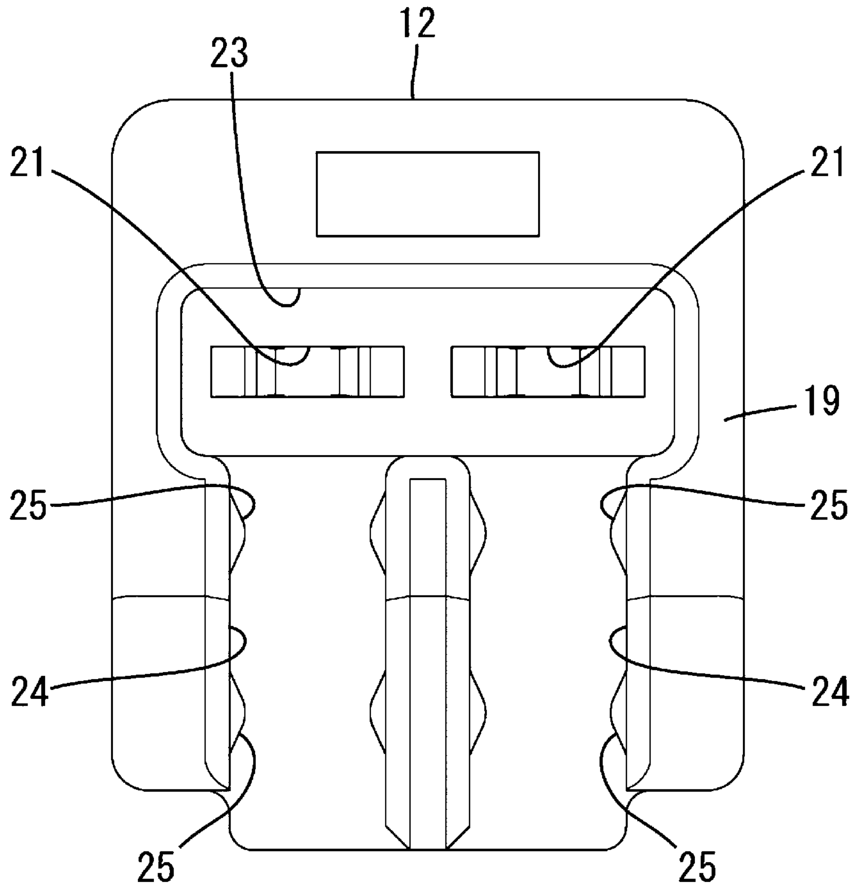
FIG. 3 is a back view of a dielectric.

As shown in FIG. 3, a pull-out recess 23 and a pair of left and right extending recesses 24 are formed to be open in the rear surface of the terminal pull-out portion 19. The pull-out recess 23 extends in a lateral direction in an upper part of the terminal pull-out portion 19 and causes the respective mounting holes 21 to be open in a back surface facing rearward. The respective extending recesses 24 extend downward from both left and right sides of the pull-out recess 23 and the lower ends thereof are open in the lower surface of the terminal pull-out portion 19. A plurality of holding protrusions 25 are formed to extend in the front-rear direction on both left and right side surfaces of the extending recess 24. A pair of the holding protrusions 25 are arranged on each of the both left and right side surfaces of the extending recess 24. The mate connecting portion 15 of the terminal 11 is pulled out into the pull-out recess 23 from the mounting hole 21. The linking portion 17 of the terminal 11 is arranged in the extending recess 24. The linking portion 17 is positioned in the lateral direction by contacting the respective holding protrusions 25. As shown in FIG. 2, the back surface of the extending recess 24 facing rearward is in the form of a slope along the inclination of the linking portion 17.

Die-Cast Member

The die-cast member 13 is a cast body and molded from zinc or zinc alloy in the case of this embodiment. As shown in FIG. 2, the dielectric 12 having the terminals 11 mounted therein is arranged in the die-cast member 13. The die-cast member 13 is configured as a shield member for suppressing noise intruding from outside into the terminals 11 and suppressing the leakage of noise from the terminals 11 to outside. This die-cast member 13 has no opening part such as a hole and ensures a good shielding property.

Figure 4:
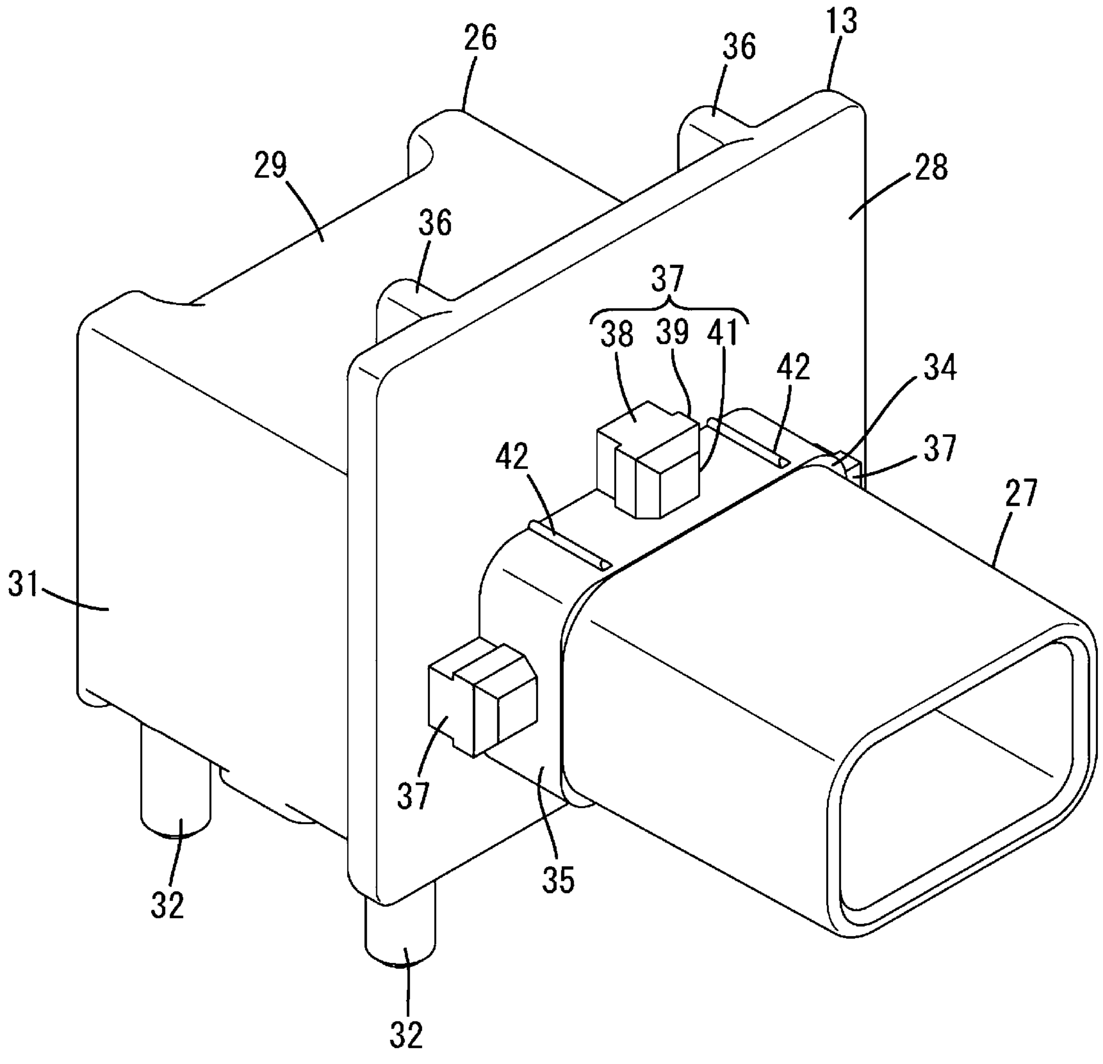
FIG. 4 is a perspective view of a die-cast member viewed obliquely from an upper front side.

Specifically, as shown in FIG. 4, the die-cast member 13 includes a surrounding portion 26 in a rear part, a receptacle 27 in a front part and a protruding portion 28 on a base end side of the receptacle 27, which is a side coupled to the surrounding portion 26. As shown in FIG. 1, the surrounding portion 26 is gate-shaped in a back view and includes a ceiling wall portion 29 and a pair of side wall portions 31 projecting downward from both left and right ends of the ceiling wall portion 29. The front end of each of the ceiling wall portion 29 and the side wall portions 31 is connected to the rear surface of the protruding portion 28.

As shown in FIG. 2, the ceiling wall portion 29 and the side wall portions 31 have a size sufficient to cover the linking portions 17 and the board connecting portions 16 in the terminals 11, and have a function of preventing the interference of external matters with the board connecting portion 16 from outside, besides the shielding property. Further, the surrounding portion 26 includes a plurality of mounting protrusions 32 projecting downward from the lower ends of the respective side wall portions 31. Each mounting protrusion 32 is in the form of a cylinder and positioned and inserted into a corresponding mounting hole 110 of the circuit board 100.

Figure 5:
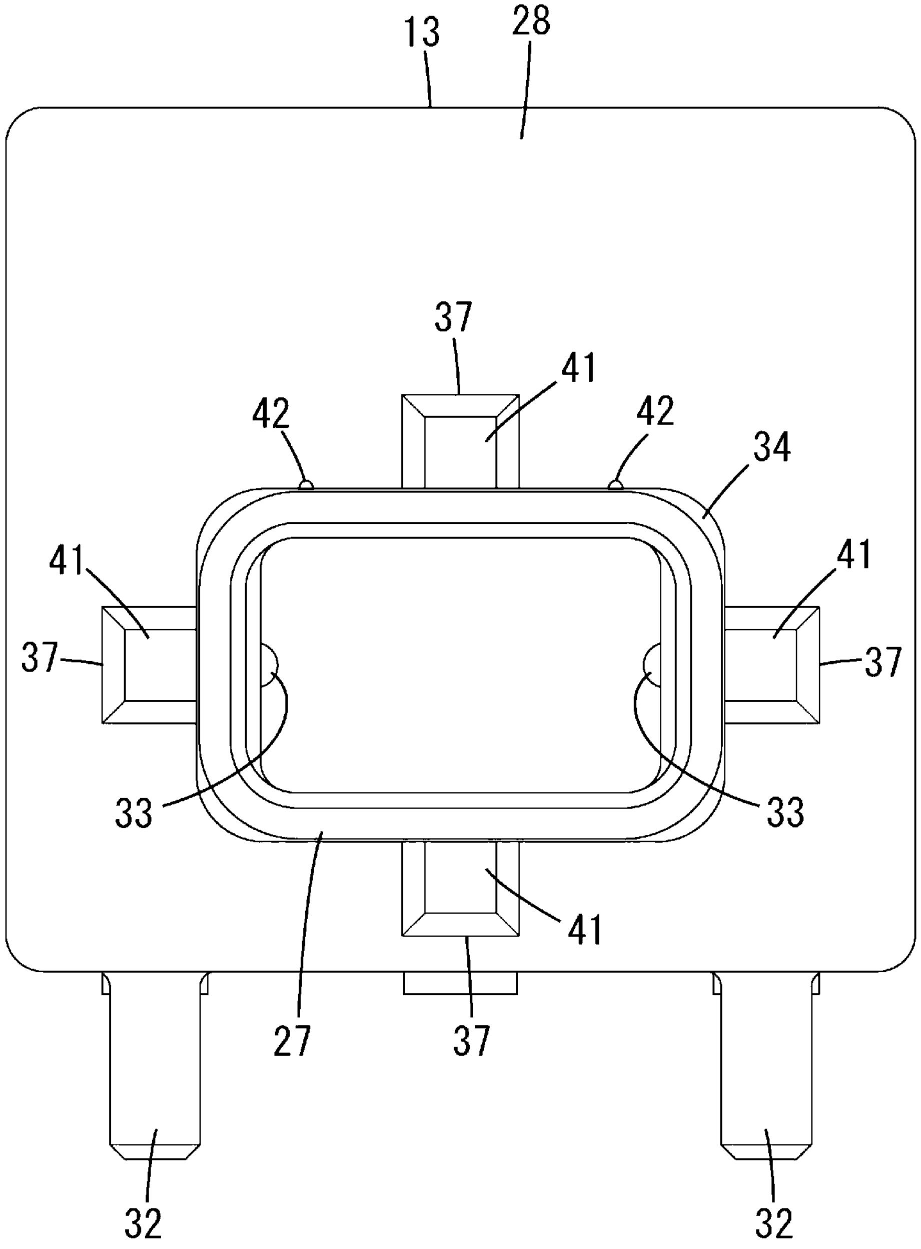
FIG. 5 is a front view of the die-cast member.

The receptacle 27 is in the form of a rectangular tube with rounded corners and, as shown in FIG. 2, the terminal mounting portion 18 of the dielectric 12 is fittable in an inner rear part. A front part of the mate connecting portion 15 of the terminal 11 is arranged to project into a front part of the receptacle 27. Further, in a state connected to the mating connector 80, the outer conductor 83 is arranged in an inner front part of the receptacle 27 and the receptacle 27 is conductively in contact with the outer conductor 83. As shown in FIG. 5, a pair of left and right fitting projections 33 are formed on the inner peripheral surface of the receptacle 27. The fitting projections 33 are press-fit into the fitting grooves 22 of the dielectric 12 and hold the dielectric 12 in the die-cast member 13. As shown in FIG. 4, step portions 34 are formed in a radial direction in a rear part of the outer peripheral surface of the receptacle 27, and a fitting peripheral surface 35 having larger dimensions in a rear part than in a front part is formed behind the step portions 34. The fitting peripheral surface 35 of the receptacle 27 is arranged to be contactable with the inner peripheral surface of a later-described through hole 47 of the housing 14 as shown in FIG. 2.

As shown in FIG. 5, the protruding portion 28 is in the form of a plate rectangular in a front view and formed to protrude radially outward from the base end side of the receptacle 27. As shown in FIG. 1, a pair of ridge portions 36 are formed at an interval in the lateral direction on the rear surface of the protruding portion 28. Each ridge portion 36 extends in the vertical direction, the lower end thereof is connected to the ceiling wall portion 29 and the upper end thereof reaches the upper edge of the protruding portion 28. An unillustrated conductive grounding member is positioned between the respective ridge portions 36. The die-cast member 13 is connected to a vehicle body via the unillustrated grounding member.

The die-cast member 13 includes a plurality of locking protrusions 37 projecting forward from the front surface of the protruding portion 28. Each locking protrusion 37 is also coupled to the fitting peripheral surface 35 of the receptacle 27 along the front-rear direction. Specifically, the respective locking protrusions 37 are arranged in laterally central parts of upper and lower parts of the fitting peripheral surface 35 of the receptacle 27 and vertically central parts of left and right parts of the fitting peripheral surface 35 of the receptacle 27. That is, the respective locking recesses 37 are arranged at an interval of 90° in a circumferential direction in a front view. The respective locking protrusions 37 are inserted and locked into later-described locking recesses 49 of the housing 14.

As shown in FIG. 4, the locking protrusion 37 includes a projecting body portion 38 in the form of a rectangular block, press-fit projections 39 protruding in a direction intersecting the front-rear direction from a front end part of the projecting body portion 38 and a tapered portion 41 connected to the front end of each of the projecting body portion 38 and the press-fit projections 39.

The press-fit projections 39 project on both left and right sides of the upper and lower locking protrusions 37 formed on the upper and lower parts of the fitting peripheral surface 35 of the receptacle 27. The press-fit projections 39 project on both upper and lower sides of the left and right locking protrusions 37 formed on the left and right parts of the fitting peripheral surface 35 of the receptacle 27. Radially outward facing outer end surfaces (upper surface of the upper locking protrusion 37, lower surface of the lower locking protrusion 37, right surface of the right locking protrusion 37, left side of the left locking protrusion 37) are flush and continuous without any step from the projecting body portion 38 to the press-fit projections 39. Three surfaces on the outer periphery of a tapered portion 41 except a front surface are inclined and tapered toward the front. The front surface of the tapered portion 41 is formed to be flat along the vertical direction and lateral direction.

Ribs 42 are formed on both left and right sides across the locking protrusion 37 on the fitting peripheral surface 35 on an upper side of the receptacle 27. The ribs 42 extend in the front-rear direction, the rear ends thereof are coupled to the front surface of the protruding portion 28 and the front ends thereof are located further forward than the front end of the locking protrusion 37.

Housing

Figure 6:
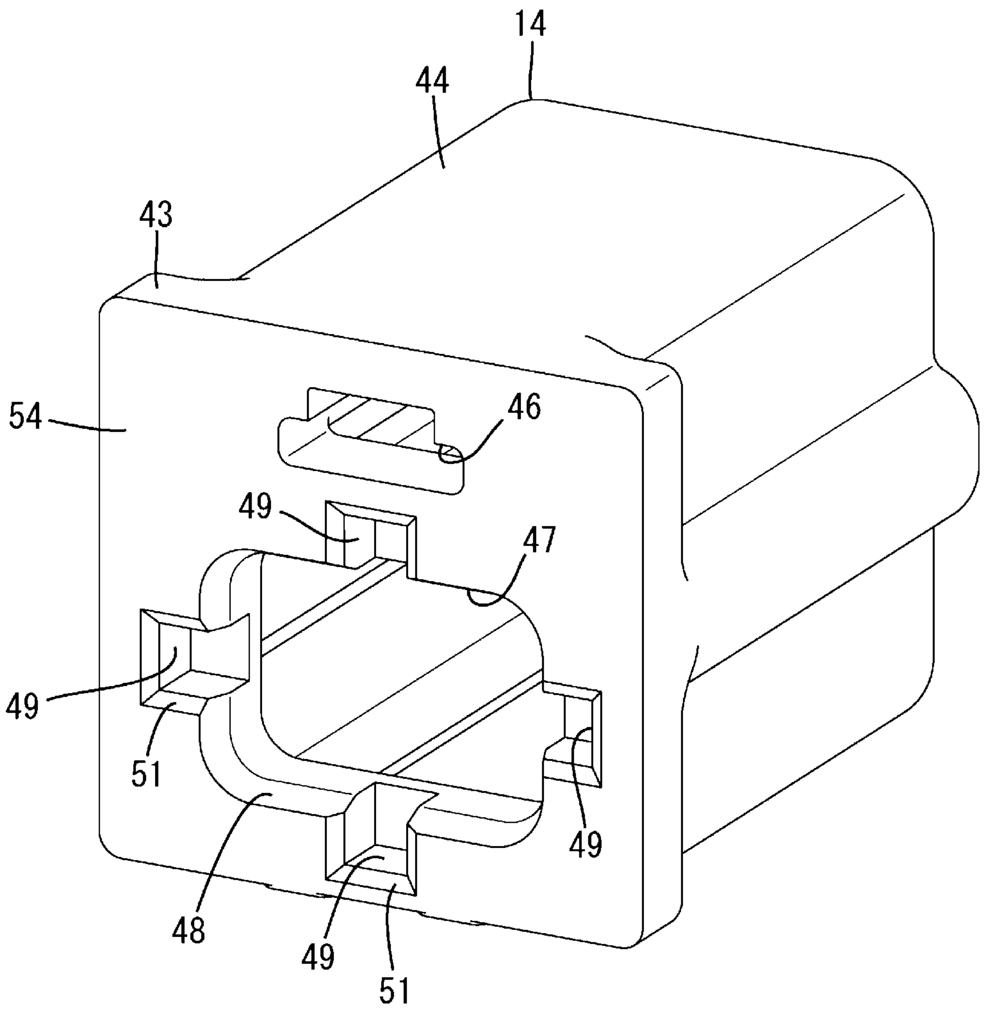
FIG. 6 is a perspective view of a housing viewed obliquely from an upper rear side.

The housing 14 is made of an insulating synthetic resin material. As shown in FIG. 6, the housing 14 includes a base wall 43 in the form of a plate rectangular in a back view and a fitting tube portion 44 in the form of a rectangular tube projecting forward from the base wall 43. As shown in FIG. 2, the mating housing 84 is fit into the fitting tube portion 44. A lock projection 45 is formed on the inner surface of the upper wall of the fitting tube portion 44. The lock arm 87 of the mating housing 84 is locked to the lock projection 45, whereby the connector 10 and the mating connector 80 are held in the connected state.

The base wall 43 is formed with a mold removal hole 46 due to the removal of a mold for molding the lock projection 45. As shown in FIG. 6, the base wall 43 is formed with a through hole 47 below the mold removal hole 46. As shown in FIG. 2, inner dimensions of the through hole 47 are smaller than those of the fitting tube portion 44, and the through hole 47 communicates with the inside of the fitting tube portion 44. The receptacle 27 of the die-cast member 13 is inserted into the through hole 47 of the base wall 43. A cross-sectional shape of the inner peripheral surface of the through hole 47 corresponds to that of the fitting peripheral surface 35 of the die-cast member 27. As shown in FIG. 6, a main inclined portion 48 expanded toward a back surface 54, which is the rear surface of the base wall 43, is formed in a rear part of the inner peripheral surface of the through hole 47.

Figure 7:
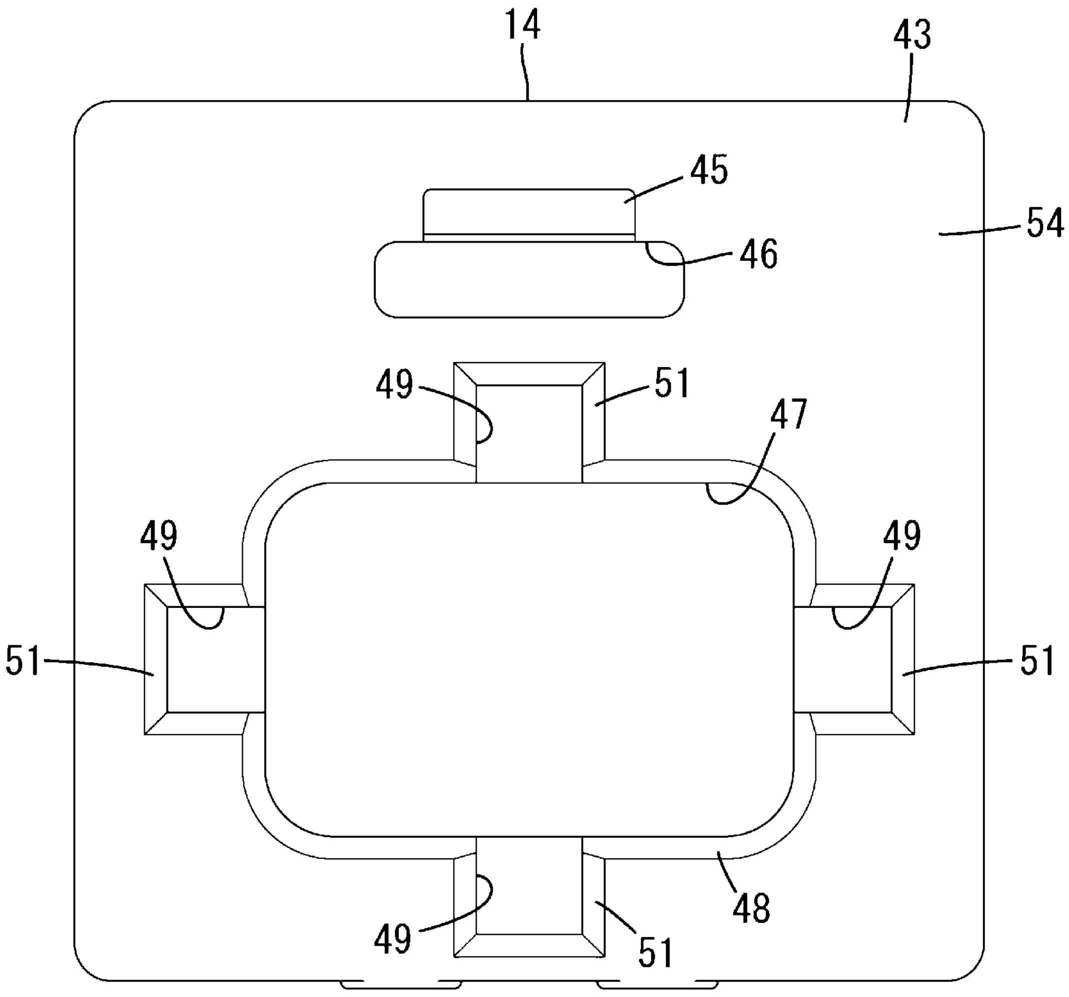
FIG. 7 is a back view of the housing.

Further, the base wall 43 is formed with a plurality of the locking recesses 49. Each locking recess 49 has a rectangular cross-sectional shape and extends in the front-rear direction, the rear end thereof is open in the back surface 54 of the base wall 43 and the front end thereof is closed inside the base wall 43. As shown in FIGS. 6 and 7, the respective locking recesses 49 are arranged at an interval of 90° in the circumferential direction in a back view. Inner ends of the respective locking recesses 49 facing radially inward are open to the through hole 47. Specifically, the respective locking recesses 49 are arranged in laterally central parts of upper and lower inner surfaces of the through hole 47 and vertically central parts of left and right inner surfaces of the through hole 47. Rear parts of the respective locking recesses 49 are formed in the main inclined portion 48. An auxiliary inclined portion 51 expanded toward the back surface 54 of the base wall 43 is formed in a rear end part of the inner surface of each locking recess 49. A front-rear length of the auxiliary inclined portion 51 is sufficiently shorter than that of the main inclined portion 48.

Assembling Structure of Die-Cast Member and Housing

The receptacle 27 of the die-cast member 13 is inserted into the through hole 47 of the housing 14 from behind. In a final stage of an insertion process, the fitting peripheral surface 35 of the receptacle 27 is arranged to be contactable with the inner peripheral surface of the through hole 47, and the respective ribs 42 tightly contact the inner peripheral surface of the through hole 47. Further, in the final stage of the insertion process, the locking protrusions 37 are inserted into the locking recesses 49 from behind while the tapered portions 41 are guided by the auxiliary inclined portions 51. The front surface of the protruding portion 28 of the die-cast member 13 butts against the back surface 54 of the base wall 43, whereby an assembling operation of the die-cast member 13 is stopped. The mold removal hole 46 of the base wall 43 is closed by the protruding portion 28 (see FIG. 2). A part of the receptacle 27 forward of the fitting peripheral surface 35 projects into the fitting tube portion 44 of the housing 14 and is arranged to be contactable with the outer conductor 83 at the time of connection to the mating connector 80.

Figure 8:
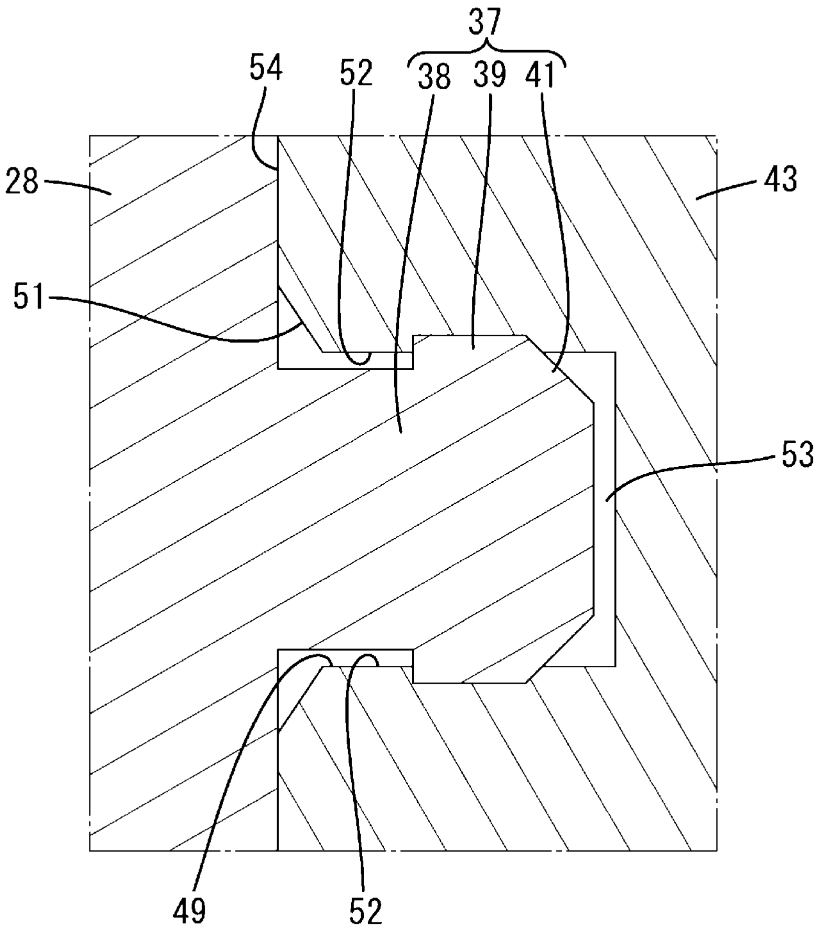
FIG. 8 is an enlarged section showing a state where a locking protrusion is press-fit in a locking recess.

Further, if the locking protrusion 37 is properly inserted into the locking recess 49, the press-fit projections 39 are pressed into contact with two facing surfaces 52 of the locking recess 49 facing each other in the circumferential direction as shown in FIG. 8. In this way, the locking protrusion 37 is locked in the locking recess 49 and the die-cast member 13 is retained and held in the housing 14.

Furthermore, with the locking protrusion 37 properly inserted in the locking recess 49, a closing portion 53, which is a closed space, is formed between the press-fit projections 39 of the locking protrusion 37 and a back end side, which is a front end side, of the locking recess 49. The closing portion 53 is shut off from outside so that the entrance and exit of an external matter can be restricted. Specifically, the closing portion 53 is set in a sealed state by four surfaces constituting the inner surface of the locking recess 49, the tapered portion 41 of the locking protrusion 37 and the fitting peripheral surface 35 of the receptacle 27.

In the process of inserting the locking protrusion 37 into the locking recess 49, the press-fit projections 39 may scrape the resin on the facing two surfaces 52 of the locking recess 49 to produce resin pieces. However, in the case of this embodiment, the produced resin pieces are pushed to the back end side of the locking recess 49 to enter and be kept in the closing portion 53. Thus, the fall of the resin pieces on the circuit board 100 can be prevented with good reliability by a relatively simple structure. Note that the closing portion 53 only has to be shut off from outside to such an extent that the entrance and exit of an external matter can be restricted, and may not be completely shut off from outside.

Particularly, since the press-fit projections 39 are locked to the inner surface of the locking recess 49 in the case of this embodiment, the die-cast member 13 is stably held in the housing 14. Further, the closing portion 53 is formed further on the back side than parts to be locked by the press-fit projections 39 inside the locking recess 49, whereby the sealed state of the closing portion 53 can be satisfactorily maintained.

Further, since the locking protrusions 37 are formed to be connected to the front surface of the protruding portion 28 and the fitting peripheral surface 35 of the receptacle 27, the structure of a die for molding the die-cast member 13 is not particularly complicated. Furthermore, since the locking recesses 49 communicate with the through hole 47 of the base wall 43 and are formed to be open in the back surface 54 of the base wall 43, the structure of a mold for molding the housing 14 is also not particularly complicated.

Furthermore, since the ribs 42 are formed on both sides across the locking protrusion 37 on the outer peripheral surface of the receptacle 27 and contact the inner peripheral surface of the through hole 47, a holding force for holding the die-cast member 13 in the housing 14 can be enhanced and, further, rattling between the die-cast member 13 and the housing 14 can be suppressed.

Other Embodiments of Present Disclosure

The embodiment disclosed this time should be considered illustrative in all aspects, rather than restrictive.

As another embodiment, the locking protrusion may not include the press-fit projections and may be shaped to be entirely press-fit into the locking recess.

As another embodiment, the closing portion may not be a space and may be formed between contact surfaces of the tip of the locking protrusion and the back end of the locking recess.

As another embodiment, the ribs may not be formed on the outer peripheral surface of the receptacle. As another embodiment, the die-cast member may be made of aluminum die casting using an aluminum alloy or the like.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:
a terminal;
a die-cast member configured to surround an outer periphery of the terminal;
a dielectric arranged between the terminal and the die-cast member; and
a housing into which the die-cast member is mounted, wherein:
the die-cast member includes a locking protrusion,
the housing includes a locking recess recessed in a mounting direction of the die-cast member,
the locking protrusion is press-fit into the locking recess, and
a closed portion formed by a space that is shut off from outside is formed between a tip part of the locking protrusion in the mounting direction and a back end part of the locking recess in the mounting direction in a state where the locking protrusion of the die-cast member is completely inserted into the locking recess of the housing.

2. The connector of claim 1, wherein:
the locking protrusion is formed with a press-fit projection protruding in a direction intersecting the mounting direction, and
the closed portion is formed further on a back side in the mounting direction than a part of an inner surface of the locking recess locked by the press-fit projection inside the locking recess.

3. The connector of claim 2, wherein the locking protrusion includes a tapered portion connected to a front end of a body of the locking protrusion, and the die-cast member includes a receptacle in which the terminal is arranged.

4. The connector of claim 3, wherein the space is defined by four inner surfaces of the locking recess of the housing, the tapered portion of the locking protrusion, and an outer peripheral surface at a base end side of the receptacle.

5. The connector of claim 1, wherein:
the die-cast member includes a receptacle, the terminal being arranged inside the receptacle, and a protruding portion protruding in a direction intersecting the mounting direction from a base end side of the receptacle,
the locking protrusion is formed to be connected to a front surface of the protruding portion facing in the mounting direction and an outer peripheral surface of the receptacle.

6. The connector of claim 5, wherein:
the housing has a back surface facing the front surface of the protruding portion and a through hole open in the back surface, the receptacle being arranged inside the through hole, and
the locking recess communicates with the through hole and is open in the back surface of the housing.

7. The connector of claim 6, wherein ribs brought into contact with an inner peripheral surface of the through hole of the housing are formed on both sides across the locking protrusion on the outer peripheral surface of the receptacle.

* * * * *